United States Patent [19]

Sharma

[11] Patent Number: 6,012,061
[45] Date of Patent: Jan. 4, 2000

[54] METHOD AND APPARATUS FOR DELETING NODES IN PATRICIA TREES

[75] Inventor: Supriya S. Sharma, Apex, N.C.

[73] Assignee: International Business Machines Corp.

[21] Appl. No.: 08/978,697

[22] Filed: Nov. 25, 1997

[51] Int. Cl.[7] .................................................. G06F 17/30
[52] U.S. Cl. ........................ 707/100; 707/101; 341/51; 341/67
[58] Field of Search .................................. 707/100, 101; 341/51, 67

[56] References Cited

U.S. PATENT DOCUMENTS

| 4,906,991 | 3/1990 | Fiala et al. | 341/51 |
| 5,058,144 | 10/1991 | Fiala et al. | 375/122 |

OTHER PUBLICATIONS

"Algorithms in C", By: Robert Sedgewick, Addison–Wesley Publishing Company, Reading, Mass., 1990. pp. 245–258.
"The Art of Computer Programming", By: Donald E. Knuth, Stanford University, Addison–Wesley Publishing Company, Reading, Mass., 1973. pp. 489–500.

Fiala et al., "Data Compression With Finite Windows (Several Methods For Adaptive, Invertible Data Compression)", Communications of the ACM, vol. 32, No. 4, Apr., 1989, pp. 490–505.

Jiang, J, Implementing the Patricia Data Structure for Compression Algorithms with Finite Size Dictionaries, International Conference on Data Transmission–Advances in Modern and ISDN Technology and Applications9Conf. Publ. No. 356) Sep. 23–25, 1992.

Bays, J. C., The Complete Patricia, (Dissertation) The University of Okholoma, Norman Ok, Jan. 1974, UMI Order No. 75–6498.

*Primary Examiner*—Paul R. Lintz
*Attorney, Agent, or Firm*—Jerry W. Herndon

[57] ABSTRACT

Any node of a Patricia tree is deleted by selecting as the replacing node the node immediately prior to the deletion node in the unique path to the deletion node. Once the replacing node is determined in this manner, the deletion node is easily removed by simple pointer adjustments of the affected surrounding nodes. Nodes are deleted in time consistent with node insertion time. It is now practicable to use Patricia trees in dynamic situations in which nodes are created and deleted frequently.

6 Claims, 3 Drawing Sheets

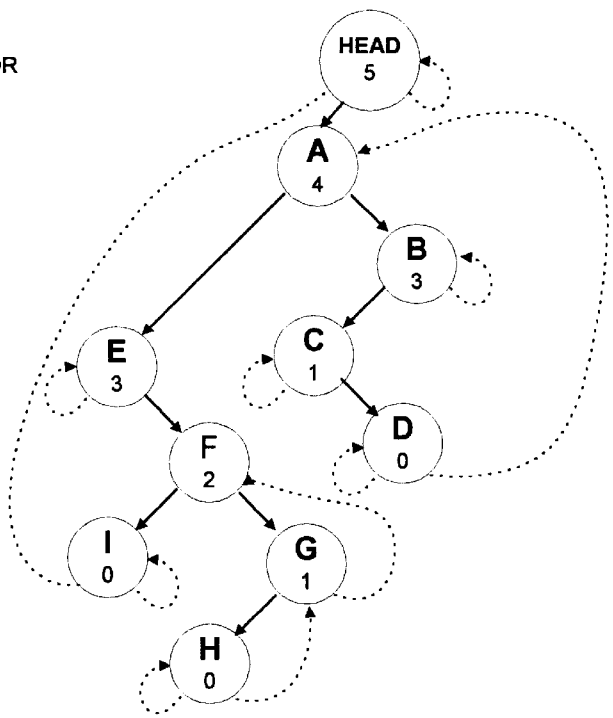
FIG. 1 - PRIOR ART
NODE KEY VALUES
A = 010111
B = 011111
C = 010101
D = 010110
E = 000111
F = 001111
G = 001101
H = 001100
I = 001011
FIG 2
DELETE NODE C.
ALL INVOLVED NODES ARE DISTINCT.
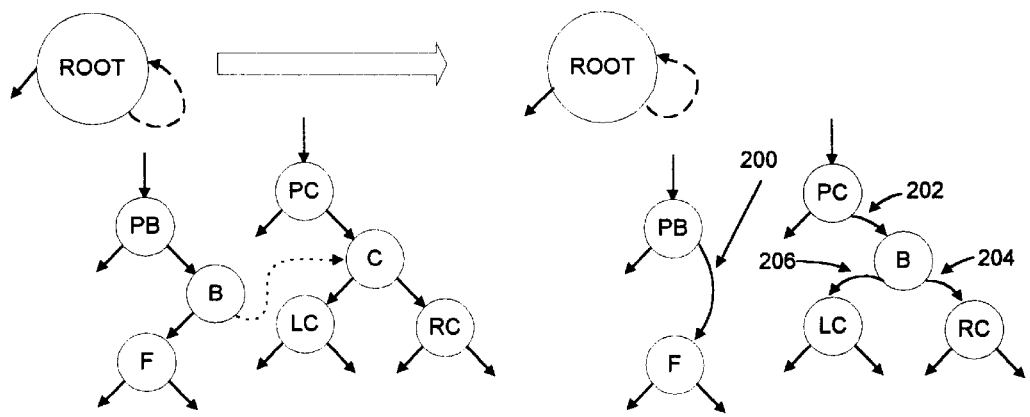

METHOD AND APPARATUS FOR DELETING NODES IN PATRICIA TREES

TECHNICAL FIELD

The invention relates to the deletion of nodes in hierarchical data trees used in computing and specifically to the deletion of nodes in such trees known as Patricia trees.

BACKGROUND OF THE INVENTION

The use of binary trees and the like is well known in the art. The subject is discussed extensively in treatises such as "The Art of Computing—Sorting and Searching" by Knuth, Addison-Wesley, 1975; "Algorithms in C" by Robert Sedgewick; Addison-Wesley, 1990; and "Data Structures and Algorithms" by Al Aho et al, Addison-Wesley, 1983. Generally, it can be said that the building of trees, the searching of such trees and the insertion of nodes into such trees is relatively easy and well understood. The deletion of nodes is generally more difficult. It is well known that one way of deleting a tree node is to replace it with another existing node in the tree. First, the replacing node has to be determined and then the pointers in affected nodes of the tree are adjusted to reflect the replacement, all while preserving the properties of tree construction in the particular tree in question. The major problem in deletion is often that of determining the replacing node. Also, depending on the particular type of tree in question, there can be many individual cases, depending on the location in the tree of the node to be deleted, which must be accounted for in preserving the properties. Thus, deletion is relatively simple in certain types of trees such as simple binary trees, but very difficult in other types of trees. An example of the latter is the Patricia (Practical Algorithm to Retrieve Information Coded in Alphanumeric) tree.

A Patricia tree is an efficient way of storing keys of arbitrary length. It can be searched by traversing the tree with only one full key comparison, which is done at the end of the search to determine if an actual match has been found on the search key. Every node in a Patricia tree is reached by a unique path through the tree. Further, Patricia trees eliminate the problem of one way branching which occurs in other types of search trees, which means that in a system of N keys, there are only N nodes in the search tree. In other types of trees there can be many more nodes, representing wasted space, than there are keys. Because of these desirable characteristics, the Patricia tree is popular in certain types of applications such as indexing documents on actual text. However, at the present time, Patricia trees have one great disadvantage. Until now, to my knowledge, no one has discovered any reasonable method of deleting nodes in a Patricia tree. Sedgewick and Knuth, for example, describe in detail the algorithms for building, searching and inserting nodes into a Patricia tree. However, the problem of deleting nodes is not even mentioned. Aho does not discuss Patricia trees. Neither does D. R. Morrison discuss deleting nodes in his original paper "Patricia—Practical Algorithm to Retrieve Information Coded in Alphanumeric", Journal of the ACM, Vol. 15, 1968. In all instances known to me of the use of a Patricia tree, nodes are deleted by rebuilding the entire tree. The disadvantages of this are obvious, especially in trees which can be quite large or in which deletion occurs frequently. As a result, the Patricia tree has not gained widespread use, except in applications in which node deletion is relatively infrequent or in which the tree is relatively small. Thus, there is a great need to determine a way of dynamically deleting nodes of a Patricia tree in reasonable time and thereby expand the use of this desirable tree to many more areas of use.

SUMMARY OF THE INVENTION

I have discovered that Patricia tree nodes may be deleted by always selecting as the replacing node the node immediately prior to the deletion node in the unique path to the deletion node. Once the replacing node is determined in this manner, the deletion node is easily removed by simple pointer adjustments of the affected surrounding nodes. Using my invention, nodes may be deleted in time consistent with node insertion time. This, in turn, means that it is now practicable to use Patricia trees in dynamic situations in which nodes are created and deleted frequently.

BRIEF DESCRIPTION OF THE DRAWING

In the drawing,

FIG. 1 shows an illustrative Patricia tree which is used to describe the characteristics and operations of these desirable types of trees;

FIG. 2 is used to disclose the method of node deletion in a Patricia tree according to the invention in which all nodes of the tree affected by a deletion are distinct (separate) nodes;

DETAILED DESCRIPTION

Figure 3:
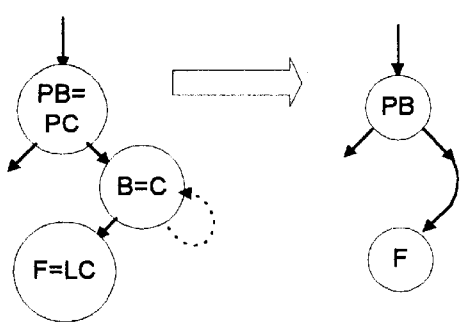
FIGS. 3 through 6 describe the operation of the invention in all of the known situations which can occur in Patricia trees in which some of the nodes of the tree affected by a deletion are not distinct.

First, as a convenience to the reader and for an understanding of the invention, the characteristics of Patricia trees are described. FIG. 1 shows one example of a Patricia tree having nodes A through I. The designations A . . . I of the nodes is arbitrary. By definition, the key value represented by a node is stored in association with the node. However, this key value is not examined as a search progresses down the tree. It is only examined one time when the search terminates. A search is terminated by an upward pointing link [or a downward pointing link, depending on the direction of most significant bit (MSB) to least significant bit (LSB) of the search key that is used in any given implementation] to the next node in the search. In this preferred embodiment, the direction of MSB to LSB is left to right. Therefore, in FIG. 1, all upward pointing links terminate a search and are indicated with a dashed line. Upward pointing links or downward pointing links are determined by a bit index stored in association with each node. A bit index associated with a node is the bit position in the search key to be examined at that node to determine which child branch to take out of the node. This bit index is indicated in FIG. 1 immediately below each node designation. For example, node A contains the bit index 4. This means that bit 4 of the search key should be examined to determine the child branch to take when traversing the tree. If bit 4 is a 1, the right child branch is taken. If bit 4 is a 0, the left child branch is taken. Note that an upward pointing link is defined as a link that points to a node that has bit index equal to or greater than that of the present node. If an implementation is chosen that uses a direction of right to left for the direction of MSB to LSB, then a downward pointing link terminates a search and is defined as a link that points to a node that has a bit index equal to or less than that of the present node. In this preferred embodiment, a search terminates when an upward pointing link is encountered. This is easy to detect, since by definition the bit indices must decrease as the tree is traversed downward. In an implementation that uses right to left direction for MSB to LSB for the search key, then the bit indices would increase as the tree is traversed downward.

To the left of the tree in FIG. 1 is a table which contains the key value stored in each node of this illustrative tree. When a search terminates by encountering an upward link, the node pointed to by the upward link is the only node in the tree which might contain the search key. To determine if this is true, the key value stored in the node is compared to the search key. If the keys match, the search is successful; otherwise, the search is unsuccessful.

As an illustration of a search of the tree of FIG. 1, suppose we are given the search key of 001111. The most significant bit (or leftmost bit) of the key is identified by bit position 5; the rightmost bit is identified as bit position 0. The search begins at node A, which is the head node. In the preferred embodiment, the head node always contains a left child link that links to the remainder of the tree and a right child pointer that links to the head node. By definition in this embodiment, the bit index of the head node examines the MSB of the search key (bit 5) and bit 5 must be a 0 to force a branch to the left child node A. Node A contains the bit index 4. Therefore, bit 4 of the search key is examined. Since the value of bit 4 of the search key is 0, the left child of node A is taken. This points to node E. The bit index at node E is 3. Since the value of bit 3 of the search key is 1, the right child link is taken, which points to node F. The bit index at node F is 2. The value of bit 2 of the search key is 1. Therefore, the right child link is taken to node G. At node G, the value of bit 1 of the search key is examined, and since the value is 1, the right link is taken which points to node F. This is the first upward pointing link encountered in the search. Therefore, this terminates the search. The key value stored in node F is compared to the search key to determine if the search is successful.

The above example shows a search in which successive bit positions 5 through 1 of the search key are examined. An example of a search in which bit positions of the search key are skipped would be a search for node D using the search key 010110. In this search, node A examines bit 4, node B examines bit 3, node C examines bit 1 and node D examines bit 0. This search encounters the upward link at node D which points to itself. In this example, the key value 010110 of node D matches the search key 010110. Therefore, this search is successful.

The properties governing Patricia trees, which have been summarized above, result in simple algorithms for inserting nodes into a tree and for searching a tree. For completeness, the C code implementation for these algorithms presented by Sedgewick is presented immediately below.

TABLE 1

Algorithm for Searching a Patricia Tree
static struct node {int key, info, b; struct node *1, *r; }; static struct node *head;

```
int patriciasearch(int v)
{
    struct node *p, *x;
    p = head; x = head->1;
    while (p->b > x->b)
    {
```

TABLE 1-continued

Algorithm for Searching a Patricia Tree
static struct node {int key, info, b; struct node *1, *r; }; static struct node *head;

```
        p = x;
        x = (bits(v, x->b, 1)) ? x->r : x->1;
    }
    if (v == x->key) return x->info; else return -1;
}
```

TABLE 2

Algorithm for Inserting a Node in a Patricia Tree

```
patriciainsert (int v, int info)
{
    struct node *p, *t, *x;
    int i = maxb;
    p = head; t = head->1;
    while (p->b > t->b)
    {
        p = t;
        t = (bits (v, t->b, 1)) ? t->r : t->1;
    }
    if (v == t->key) return;
    while (bits(t->key, i, 1) == bits (v, i, 1)) i--;
    p = head; x = head->1;
    while (p->b > x->b && x->b > i)
    {
        p = x;
        x = (bits (v, x->b, 1)) ? x->r : x->1;
    }
    t = (struct node *) malloc (sizeof *t);
    t->key = v; t->info = info;
    t->b = i;
    t->1 = (bits (v, t->b, 1)) ? x : t;
    t->r = (bits (v, t->b, 1)) ? t : x;
    if (bits (v, p->b, 1)) p->r = t;
    else p->1 = t;
}
```

The function bits (x,y,1) evaluates the value of the bit in position y of the integer x. For MSB to LSB direction left to right, this is the (y+1)st bit from the right. For MSB to LSB direction right to left, it is the (y+1)st bit from the left.

FIG. 2 shows a general and illustrative Patricia tree that is used to demonstrate the deletion of a node according to the invention. By example, node C is to be deleted from the tree on the left of FIG. 2; the tree after deletion of node C is shown on the right of FIG. 2.

For consistency and for understanding, the following nomenclature is used in FIG.2 and in all other examples in this specification:

Node C is always the node to be deleted;
Node B is the node containing an upward link to node C;
Nodes PB and PC are, respectively, the parent nodes of nodes B and C;
Nodes LC and RC are always, respectively, the left and right child nodes of node C;
Node F is always the remaining child node, if any, of node B.

The properties of Patricia tree construction that must be satisfied after deleting a node by replacing it with an existing node are:

1. In the unique path to each node of the tree, the node must appear twice, once as the node is first passed with a downward link and second, again as a result of an upward link to the node.
2. The bit indices of the nodes in any path must be monotonically decreasing (in the preferred embodiment) as the tree is traversed downward, except for the last upward pointing link.

3. For any node with a bit index i, the bits in positions M-1 through i+1 of the key are the same for both it and its children, where M is the bit length of the key. If an implementation uses the MSB to LSB direction of right to left in the key, then the rule is that the bits in positions 0 through i-1 of the key are the same for the node and its children.

Figure 7:
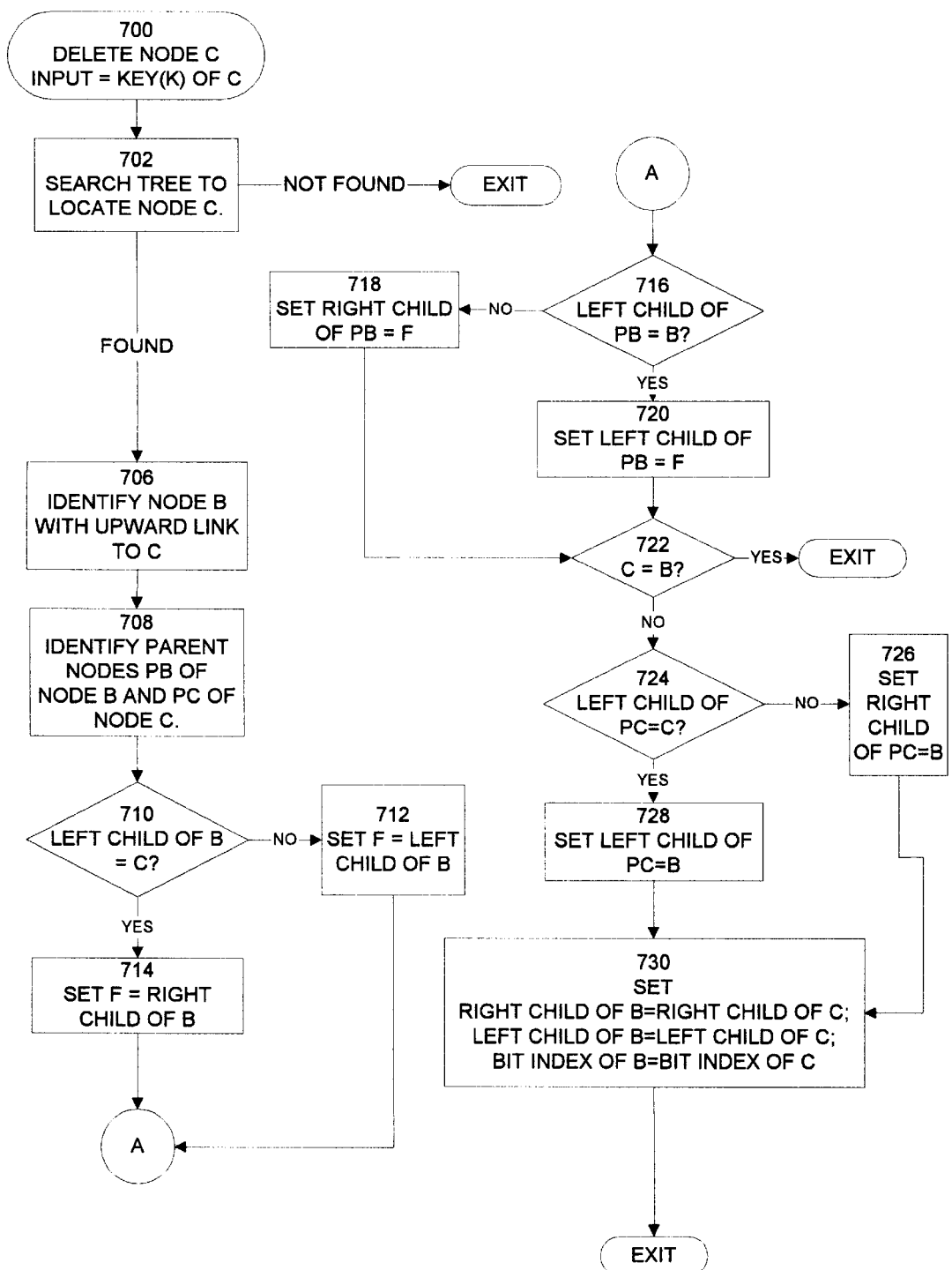
FIG. 7 shows an illustrative flowchart of the steps of the invention.

FIG. 7 shows an illustrative flowchart of the delete node algorithm. The corresponding C code is shown below in table 3. FIGS. 2 and 7 and table 3 should be referred to simultaneously to follow the following discussion. The algorithm is called with the key of the node C to be deleted. This occurs at step 700 of FIG. 7 and refers to the initial entry point of the algorithm in table 3. Step 702 of FIG. 7 locates node C with the conventional search algorithm by finding the upward link from node B to node C. This corresponds to lines 3–17 of table 3. Step 706 of FIG. 7 identifies node B as the node with the upward link. This corresponds to line 19 of table 3. Next, the parent nodes PB and PC of nodes B and C, respectively, are identified at step 708 and lines 20–21 of table 3. Steps 710, 712 and 714 determine if node F is the left or right child of node B. This corresponds to lines 23–26 of table 3. Step 716 now determines if node B is the left or right child node of PB. If B is the right child of PB, step 718 sets the right child pointer of node PB equal to F. This is the case in the example of FIG. 2, and step 718 causes the right child pointer of PB to point to node F as shown at 200 of FIG. 2. This corresponds to line 31 of table 3. Similarly, if B is the left child of PB, step 720 sets the left child pointer of PB equal to F (line 29). Step 722 (line 33 of table 3) now determines whether node C is the same node as node B. This can occur when the node to be deleted has an upward child pointer to itself. This represents a special case to be discussed in more detail below. It is not the general case in FIG. 2. In this general case, step 724 (line 34) determines if the left child of PC equals C. This is not the case in FIG. 2, so step 726 (line 37) sets the right child pointer of PC equal to B. This causes the right child pointer of node PC in FIG. 2 to point to B as shown at 202. Had the left child of PC been C, then step 728 would have caused the left child pointer of PC to point to the replacing node B (line 35). Finally, at step 730 (lines 38–40 of table 3), the right child pointer of B is set to point to the right child of C as shown at 204, the left child pointer of B to point to the left child of C as shown at 206 and the bit index of B to equal that of node C. Node C is now completely removed from the tree. The last step in Table 3 at line 42 calls a function to release any memory that has been allocated to the deleted node C.

It remains to verify that the above three properties of Patricia tree construction are intact in the new tree. The note B chosen to replace C is the second last in the path to it. By properties 1 and 2, node B necessarily has the lowest bit index in the path to C. By property 3, the key of node B (as well as that of node F and all of its descendants) comes the closest to the key of node C. However, there is a crucial difference between node B and its descendants. The purpose served by the bit index, say $i_B$, of node B is to differentiate between searches for the keys of nodes C and F which first differ (from the left) in their $i_B$th bit position. It should be noted that since the link from node B to C is an upwards link, there are no other keys starting with bits, $c_{M-1}, c_{M-2} \ldots c_{iB}$, whose searches node B would participate in. Therefore, without node C in the tree, the bit index of node B becomes redundant. Again, because of properties 2 and 3, it is seen that node F could easily be pointed to by node PB, with bit index $i_{PB} > i_B$, instead of by node B with no difference made to searches for node F or its descendants. Therefore, the algorithm makes node PB the parent of F.

When Node B replaces node C in the tree, node B takes on the parent, children and bit index of C as its own, as described above. However, the key of node B remains the same. Since the bit index of node C, $i_c$, is greater than that of B, by property 1, the bits in positions M-1, M-2, ... $i_c$+1 of the key of B are the same as those of the children of C. Therefore, all of the properties 1 through 3 are satisfied and node B successfully replaces node C.

When all the nodes B, PB, F, PC, C, LC and RC involved in the deletion of C are distinct, it is seen by the above arguments that properties 2 and 3 are satisfied for all nodes and paths. By distinct, it is meant that each of these nodes are distinct from each other as illustrated by FIG. 2. As will be discussed briefly below, some special cases which should be examined involve non-distinct nodes, such as when B=C, meaning that the node to be deleted has an upward child pointer that points to itself. For distinct nodes, Property 1 is satisfied for all nodes, though a comment should be made regarding the path to node B. It can be verified that a search for node B in the new tree completes successfully by noting that no child pointer of any node with index lower than that of B is modified by the algorithm. Therefore the node that points upwards to B before the delete of C (F or one of its descendants) still points to B after the deletion. Since the bit index of B increases during the delete operation, the link to it remains an upwards link.

TABLE 3

Algorithm for Deleting a Node in a Patricia Tree

```
/* Function to delete node corresponding to key K from Patricia tree */
    struct node {int key, index; node *left_child, *right_child};
    void delete (int K)
    {
        /* first locate node c corresponding to key K. */
        node *p, *b, *pb, *pc, *f;
        p = & head;
        t = p->left_child;
        while (p->index > t->index) {
            p = t;
            if (bits (K, t->index) == 1)
                t = t->right_child;
            else
                t = t->left_child;
        }
        c = t;
        /* If key K not found, exit the function */
        if (K != c->key)
            exit (0);
        /* identify nodes b, pb and pc */
        b = p; /* b is node immediately preceding c */
        pb = parent (b);
        pc = parent (c);
        /* Identify whether node f is left or right child of b */
        if ( b->left_child == c )
            f = b->right_child;
        else
            f = b->left_child;
        /* make pb parent of f instead of that of b */
        if ( pb->left_child == b
            pb->left_child = f;
        else
            pb->right_child = f;
        /* replace c by b */
        if ( c != b ) {
            if ( pc->left_child == c )
                pc->left_child = b;
            else
                pc->right_child = b;
```

TABLE 3-continued

Algorithm for Deleting a Node in a Patricia Tree

```
        b->right_child = c->right_child;
        b->left_child = c->left_child;
        b->index = c->index;
    }
    free (c);
}
```

Examples of non-distinct node situations are now discussed. FIG. 3 shows the situation in which the right child of node C points to itself (node C) with an upward pointer. In other words, the node immediately preceding the node to be deleted in the terminating path is the same node (node B=node C; PB=PC). When this occurs, the code at lines 34–40 of Table 3 is not executed, and the result of executing the algorithm is that the right child of node PB is node F.

Figure 4:
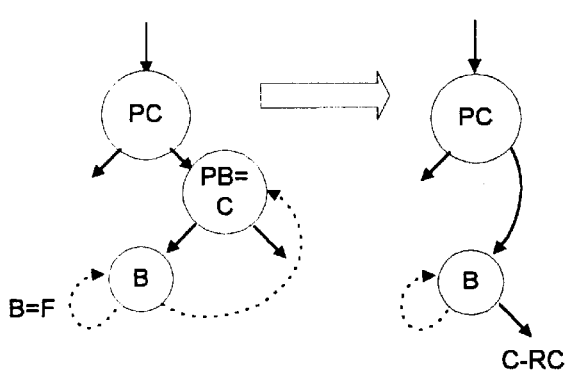

FIG. 4 shows the situation in which the parent of node B (PB) is the same node as C. Additionally, the left child of B (node F) is itself (node B) and the right child of B is the terminating upward link to the deletion node C. In this situation, line 37 of Table 3 replaces C with B, line 38 sets the right child of B to the prior right child of C and line 39 does the same for the left child, which retains the upward left child link to itself (node B).

Figure 5:
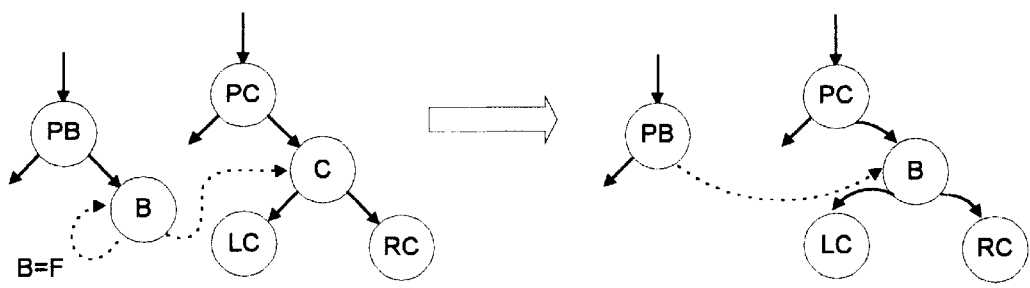

FIG. 5 shows the same situation as FIG. 4, except that C is not the parent (PB) of B. This algorithm of Table 3 works the same for this situation as for FIG. 4, except that B is upwards pointed to by PB.

Figure 6:
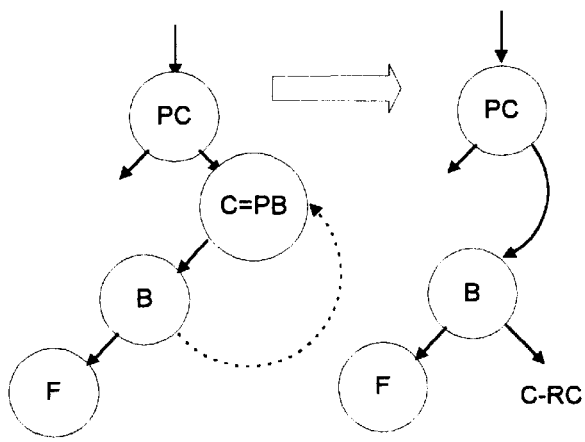

FIG. 6 shows the situation in which the deletion node C is the same as PB, the parent of B, but node B does not point to itself. In this situation, lines 26, 29 and 39 point the left child of B to F, line 38 points the right child of B to that of C and line 37 points the right child of PC to B.

As far as can be determined, FIGS. 3 through 6 illustrate all of the special cases which can occur in practice. Careful inspection of each figure and the code of Table 3 show that the properties of construction of Patricia trees is maintained by the algorithm. As further verification, numerous trees and random deletions of thousands of nodes in these trees have been computer simulated and shown that all nodes are reachable via the new tree resulting after application of the algorithm of Table 3.

It is to be understood that the above described arrangements are merely illustrative of the application of principles of the invention and that other arrangements may be devised by workers skilled in the art without departing from the spirit and scope of the invention.

What is claimed:

1. A method of deleting a node C in a tree having the properties that there is a unique path to every tree node, each node has a left child node and a right child node and corresponding left and right child pointers, each node is associated with a bit index identifying the bit position in a search key to be examined to determine whether to advance to the left child node or to the right child node as the tree is traversed, the bit indices of successive nodes monotonically decrease for trees of a first type and monotonically increase for trees of a second type as the tree is traversed, except for the last node in any path in which the bit index increases for trees of the first type and decreases for trees of the second type with respect to the bit index of the immediately preceeding node, for trees of the first type, each bit in positions M-1 through i+1 of the search key leading to a node N is equal to the corresponding bit in the search keys that lead to any of its child nodes, where i is a bit index of node N and M is the number of bits in a search key used to traverse the tree, and for trees of the second type, each bit in positions 0 through i-1 of the search key leading to a node is equal to the corresponding bit in the search keys that lead to any of its child nodes, the method comprising the steps of locating the deletion node C by traversing the tree according to a search key corresponding to the deletion node, identifying a node B immediately preceding node C in the path to node C, and replacing the node C in the tree with node B.

2. The method of claim 1 wherein the step of replacing further comprises identifying the parent node PB of replacing node B, identifying the parent node PC of the deletion node C, replacing the child pointer in node PB pointing to node B with a pointer to the child node of node B that is not node C, replacing the child pointer in node PC pointing to node C with a pointer to node B, replacing the left child pointer in node B with a pointer to the left child node LC of node C, replacing the right child pointer in node B with a pointer to the right child node RC of node C, and setting the bit index of node B equal to the bit index of node C.

3. Apparatus deleting a node C in a tree having the properties that there is a unique path to every tree node, each node has a left child node and a right child node and corresponding left and right child pointers, each node is associated with a bit index identifying the bit position in a search key to be examined to determine whether to advance to the left child node or to the right child node as the tree is traversed, the bit indices of successive nodes monotonically decrease for trees of a first type and monotonically increase for trees of a second type as the tree is traversed, except for the last node in any path in which the bit index increases for trees of the first type and decreases for trees of the second type with respect to the bit index of the immediately preceeding node, for trees of the first type, each bit in positions M-1 through i-1 of the search key leading to a node N is equal to the corresponding bit in the search keys that lead to any of its child nodes, where i is a bit index of node N and M is the number of bits in a search key used to traverse the tree, and for trees of the second type, each bit in positions 0 through i+1 of the search key leading to a node is equal to the corresponding bit in the search keys that lead to any of its child nodes, the apparatus comprising means for locating the deletion node C by traversing the tree according to a search key corresponding to the deletion node, means for identifying a node B immediately preceding node C in the path to node C, and means for replacing the node C in the tree with node B.

4. The apparatus of claim 3 wherein the replacing means further comprises means for identifying the parent node PB of replacing node B, means for identifying the parent node PC of the deletion node C, means for replacing the child pointer in node PB pointing to node B with a pointer to the child node of node B that is not node C, means for replacing the child pointer in node PC pointing to node C with a pointer to node B, means for replacing the left child pointer in node B with a pointer to the left child node LC of node C, means for replacing the right child pointer in node B with a pointer to the right child node RC of node C, and means for setting the bit index of node B equal to the bit index of node C.

5. A computer program product for deleting a node C in a tree having the properties that there is a unique path to every tree node, each node has a left child node and a right child node and corresponding left and right child pointers, each node is associated with a bit index identifying the bit position in a search key to be examined to determine whether to advance to the left child node or to the right child node as the tree is traversed, the bit indices of successive nodes monotonically decrease for trees of a first type and monotonically increase for trees of a second type as the tree is traversed, except for the last node in any path in which the bit index increases for trees of the first type and decreases for trees of the second type with respect to the bit index of the immediately preceeding node, for trees of the first type, each bit in positions M-1 through i+1 of the search key leading to a node N is equal to the corresponding bit in the search keys that lead to any of its child nodes, where i is a bit index of node N and M is the number of bits in a search key used to traverse the tree, and for trees of the second type, each bit in positions 0 through i−1 of the search key leading to a node is equal to the corresponding bit in the search keys that lead to any of its child nodes, the computer program product comprising a computer-readable medium having computer-readable program code means embodied in the medium, the computer-readable program code means comprising computer-readable program code means for locating the deletion node C by traversing the tree according to a search key corresponding to the deletion node, computer-readable program code means for identifying a node B immediately preceding node C in the path to node C, and computer-readable program code means for replacing the node C in the tree with node B.

6. The computer program product of claim 5 wherein the computer-readable program code means for replacing further comprises computer-readable program code means for identifying the parent node PB of replacing node B, computer-readable program code means for identifying the parent node PC of the deletion node C, computer-readable program code means for replacing the child pointer in node PB pointing to node B with a pointer to the child node of node B that is not node C, computer-readable program code means for replacing the child pointer in node PC pointing to node C with a pointer to node B, computer-readable program code means for replacing the left child pointer in node B with a pointer to the left child node LC of node C, computer-readable program code means for replacing the right child pointer in node B with a pointer to the right child node RC of node C, and computer-readable program code means for setting the bit index of node B equal to the bit index of node C.

* * * * *